US012762965B2

(12) United States Patent
Dumur et al.

(10) Patent No.: US 12,762,965 B2
(45) Date of Patent: Oct. 13, 2026

(54) METHOD FOR MONITORING AN ENERGY LEVEL OF AN ELECTRICAL ENERGY SOURCE OF A HYBRID POWER PLANT FOR AN AIRCRAFT

(71) Applicant: AIRBUS HELICOPTERS, Marignane (FR)

(72) Inventors: Guillaume Dumur, Salon de Provence (FR); Jérémy Camus, Ensues la Redonne (FR); Léonard Boudier, Aix-En-Provence (FR); Jean-François Logeais, Marseilles (FR); Mikaël Henaff, Aix-En-Provence (FR)

(73) Assignee: AIRBUS HELICOPTERS (FR)

( * ) Notice: Subject to any disclaimer, the term of this patent is extended or adjusted under 35 U.S.C. 154(b) by 60 days.

(21) Appl. No.: 18/950,823

(22) Filed: Nov. 18, 2024

(65) Prior Publication Data

US 2025/0225883 A1 Jul. 10, 2025

(30) Foreign Application Priority Data

Jan. 8, 2024 (FR) ....................................... 2400152

(51) Int. Cl.
*G08G 5/50* (2025.01)
*B64D 27/33* (2024.01)
(Continued)

(52) U.S. Cl.
CPC ............... *G08G 5/50* (2025.01); *B64D 27/33* (2024.01); *B64D 27/357* (2024.01); *G08G 5/55* (2025.01)

(58) Field of Classification Search
CPC . G08G 5/50; G08G 5/55; B64D 27/33; B64D 27/357; H02J 2105/32; H02J 7/82; H02J 7/34
See application file for complete search history.

(56) References Cited

U.S. PATENT DOCUMENTS 9,157,375 B2 * 10/2015 Dyrla ...................... F02C 3/113
9,716,393 B2 * 7/2017 Manikandan ............. H02J 7/80
(Continued)

FOREIGN PATENT DOCUMENTS

EP 3936376 A1 1/2022

OTHER PUBLICATIONS

French Search Report for French Application No. FR2400152, Completed by the French Patent Office, Dated Jun. 26, 2024, 9 pages.
(Continued)

*Primary Examiner* — Rami Khatib
(74) *Attorney, Agent, or Firm* — Brooks Kushman P.C.

(57) ABSTRACT

A method for monitoring an energy level of an electrical energy source capable of delivering a reference electrical power PRef for a reference time period DTRef for a reference charge level NRef. Said source comprises at least one electrical energy storage device and several sensors. Said method comprises using the sensors to acquire parameters of the electrical energy source, then calculating a main consumption time period DTprin wherein the source is able to supply an electric current carrying the reference electrical power PRef, as a function of the parameters of the source. Next, a main display of main symbols indicating the main consumption time period DTprin is displayed in order to indicate to an operator how long the source can supply the reference electrical power PRef.

20 Claims, 5 Drawing Sheets

(51) Int. Cl.
*B64D 27/357* (2024.01)
*G08G 5/55* (2025.01)

(56) References Cited

U.S. PATENT DOCUMENTS

| | | | | |
|---|---|---|---|---|
| 11,509,154 | B1 | 11/2022 | Ferrier | |
| 2021/0349154 | A1* | 11/2021 | Deng | G01R 31/3842 |
| 2022/0077691 | A1* | 3/2022 | Jeong | H02J 7/84 |
| 2022/0306307 | A1 | 9/2022 | Tsutsumi et al. | |
| 2023/0058524 | A1 | 2/2023 | Fan et al. | |
| 2023/0202321 | A1 | 6/2023 | Mazzei et al. | |
| 2023/0223777 | A1* | 7/2023 | Ferrier | B64D 43/00 322/33 |
| 2023/0361589 | A1* | 11/2023 | Ferrier | B64D 43/00 |

OTHER PUBLICATIONS

Extended European Search Report for EP Application No. 24213510.1-1002, Completed by the European Patent Office, Dated Apr. 22, 2025, 16 pages (including English translation).

* cited by examiner

Fig.4
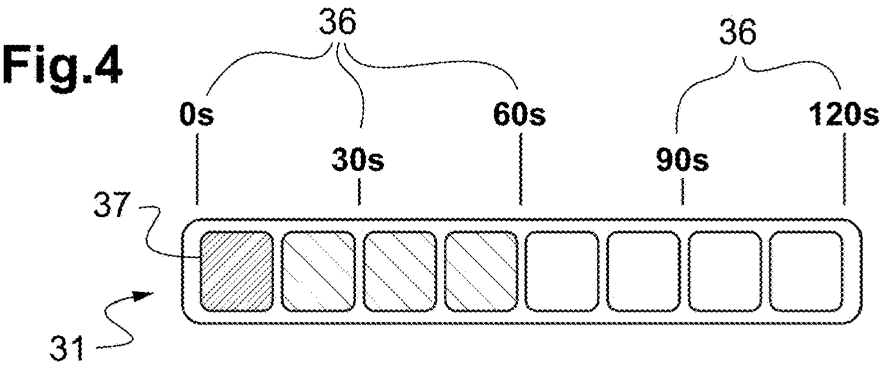
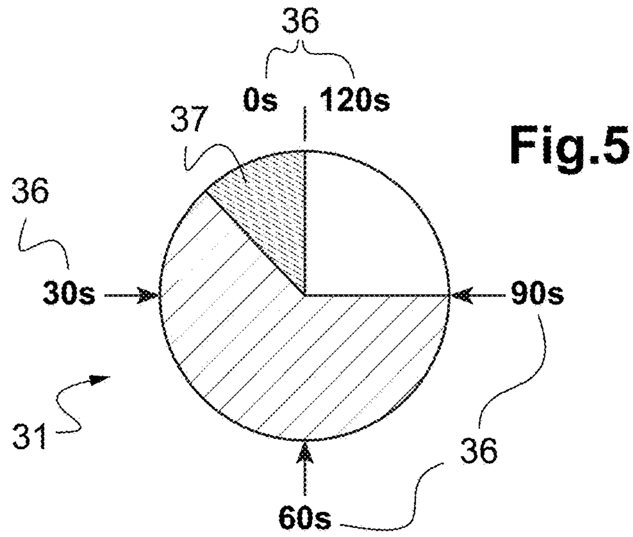
Fig.5
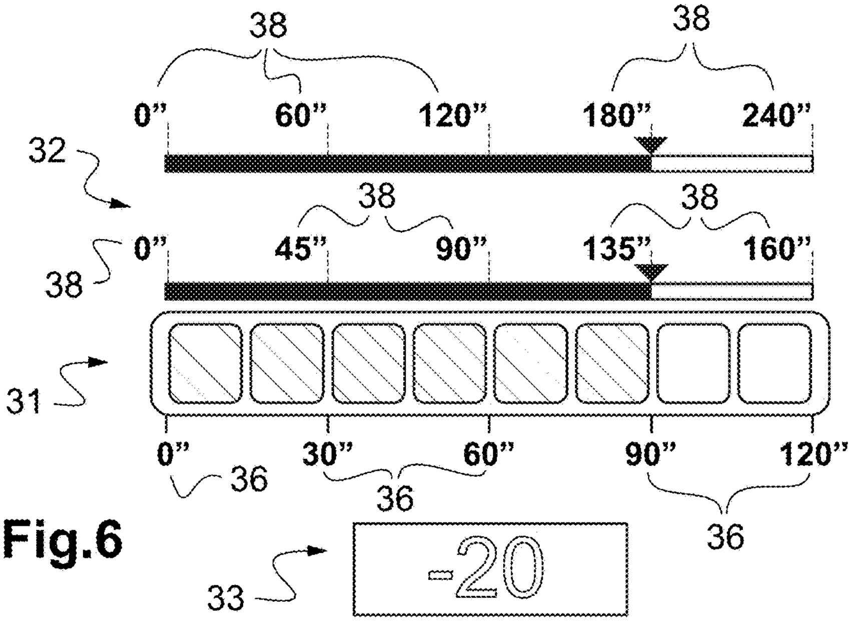
Fig.6

METHOD FOR MONITORING AN ENERGY LEVEL OF AN ELECTRICAL ENERGY SOURCE OF A HYBRID POWER PLANT FOR AN AIRCRAFT

CROSS REFERENCE TO RELATED APPLICATION

This application claims priority to French Patent Application No. FR 24 00152 filed on Jan. 8, 2024, the disclosure of which is incorporated in its entirety by reference herein.

TECHNICAL FIELD

The present disclosure lies in the technical field of hybrid power plants for aircraft, and relates more particularly to managing the electrical energy sources of these hybrid power plants.

BACKGROUND

The disclosure relates to a method for monitoring an energy level of an electrical energy source of a hybrid power plant, and an electrical energy source and an aircraft implementing this method.

An aircraft, and in particular a rotorcraft, may comprise one or more rotors for generating thrust and rotated by a hybrid power plant. A rotorcraft may, for example, comprise a lift rotor contributing to the lift and movement of the rotorcraft. A rotorcraft may also comprise an auxiliary rotor, for example a rear rotor, in particular for opposing the yaw torque exerted by the lift rotor on the fuselage of the rotorcraft and controlling the yaw movements of the rotorcraft. A rotorcraft may also comprise one or more propellers.

The hybrid power plant of such an aircraft comprises one or more heat engines and at least one mechanical transmission system arranged between the rotor or rotors and the heat engine or engines.

A hybrid power plant also comprises one or more electric machines for rotating the rotor or rotors, via said at least one mechanical transmission system.

A hybrid power plant also comprises an electrical energy source provided with one or more storage devices, such as a battery or a supercapacitor, for example. The electrical energy source supplies electrical energy to each electric machine via an electrical transmission system. Some electrical energy sources may comprise rechargeable electrical energy storage devices.

For the sake of convenience, the term "engine" refers throughout the text to any heat engine that can be used in such a power plant for a rotorcraft, for example turboshaft engines or else piston engines. The term "engine" is used in contrast to the terms "motor" or "electric machine" that describe motors driven by electrical energy.

Depending on the operation of the hybrid power plant, the engines and the electric machines may be used separately or in combination, simultaneously or sequentially.

However, the use of an electric machine to rotate a rotor is subject to certain constraints, in particular relating to the electrical energy source. Indeed, the charge level of the electrical energy source, that corresponds to the amount of electrical energy that it comprises and that can be supplied to the electric machine during flight, is limited. This charge level of an electrical energy source therefore allows electrical power to be supplied for a limited time period.

An electrical energy source with a maximum energy level is therefore dimensioned in order to supply a predefined reference electrical power for a predefined nominal consumption time period.

However, the electric machine may generate an electrical power different to this reference electrical power, this electrical power being variable as a function of the flight phase and the load on the electric machine. Therefore, if an electrical power lower than the reference electrical power is used, the time period wherein such an electrical power can be supplied is greater than the nominal consumption time period.

Furthermore, parameters of the electrical energy source, in particular its temperature and ageing, may affect the value of this charge level and/or the electric current that the source is able to supply. Moreover, an electrical energy source may be rechargeable and may therefore be recharged, at least partially, during flight, its charge level then increasing.

As a result, it may be difficult for a pilot of an aircraft to determine the time period wherein the electrical energy source is able to deliver the electrical power required by the hybrid power plant. Attempting to estimate this time period then increases the pilot's workload, which may be problematic in an emergency situation.

Document U.S. Pat. No. 11,509,154 describes a system for displaying information relating to the energy sources of an electric aircraft provided with at least one lift rotor. The system comprises a plurality of sensors measuring characteristics of the energy sources. These characteristics may comprise, in particular, the state of charge, the state of health, the remaining useful energy of an energy source, its temperature, an engine torque, a speed of rotation or a measurement of performance relating to the operation of the aircraft. The displayed information may include the remaining time of use of the aircraft, calculated using one or more characteristics. In particular, this time may be defined as a time period wherein the energy source is able to supply sufficient power to allow the aircraft to perform hovering flight.

Document US 2023/0202321 also describes a system and a method for displaying information relating to the batteries of an electric rotorcraft as a function of measurements of battery information, such as the electrical voltage at its terminals, its electric output current, its temperature and other parameters affecting its operation. The display can then show the state of health and/or operation of the batteries and the remaining flight time as a function of the amount of electricity available in the batteries. The system can detect and take into account the current flight phase and maneuver. The display of the remaining flight time and/or of the energy available in the batteries may take a programmed mission profile or the flight plan into account.

Documents US 2023/0058524, EP 3936376 and US 2022/0306307 form part of the technological background of the disclosure.

SUMMARY

The aim of the present disclosure is therefore to assist the pilot of an aircraft comprising a hybrid power plant in order to reduce his or her workload.

The present disclosure relates firstly to a method for monitoring an energy level of an electrical energy source, this electrical energy source being capable of delivering a reference electrical power PRef for a predetermined reference time period DTRef for a predetermined reference charge level NRef of the electrical energy source, and comprising:

at least one electrical energy storage device;

at least one sensor; and a calculator.

The method according to the disclosure is remarkable in that it comprises the following steps:

acquiring at least one parameter of the electrical energy source, via said at least one sensor;

calculating a main consumption time period DTprin wherein the electrical energy source is able to supply an electric current carrying the reference electrical power PRef, as a function of said at least one parameter of the electrical energy source, using the calculator; and displaying a main display of main symbols indicating the main consumption time period DTprin.

The method according to the disclosure can therefore be used to monitor the electrical energy source by means of one or more parameters of this electrical energy source.

The electrical energy source may, for example, belong to a hybrid power plant of an aircraft.

The electrical energy source may comprise a single energy storage device or several energy storage devices, that may be rechargeable. Such an energy storage device may comprise a battery, for example.

The electrical energy source also comprises one or more sensors intended to monitor the operation and the state of the electrical energy source by measuring the value of one or more parameters. The sensors can be used to measure one or more first parameters that relate directly to the electrical energy source itself, and one or more second parameters that relate to the electric current flowing in the electrical energy source.

The first parameter may be chosen from a charge level, a temperature, an internal resistance, an impedance, a residual amount and the ageing of the electrical energy source, whereas the second parameter are chosen from an electrical intensity and an electrical voltage of an electric current flowing in the electrical energy source.

The charge level may, for example, be in the form of a coefficient expressed as a percentage equal to the current amount of electrical energy contained in the electrical energy source divided by the maximum amount of electrical energy that it can contain. Ageing is a coefficient representing the effectiveness and/or efficiency of the electrical energy source as a function of its duration of use. Ageing is, for example, equal to 1 when the electrical energy source is new and reduces over the life of the electrical energy source, in conjunction with the duration and conditions of use, for example according to a predetermined law. The residual amount of the electrical energy source may vary depending on the charging profile used.

Furthermore, when the electrical energy source comprises at least two electrical energy storage devices, the parameter or parameters comprise one or more of the abovementioned parameters relating to each of these storage devices.

The calculator is connected to the sensors by a wired or wireless link and receives one or more signals carrying information relating to this or these parameters of the electrical energy source.

The calculator uses these parameters to calculate the main consumption time period DTprin. The main consumption time period DTprin may, for example, be determined using one or more laws or charts stored in a memory of the calculator or in a memory connected to the calculator. These laws or charts take into account, for example, the parameters of the electrical energy source, in particular its temperature and its ageing.

The main symbols may indicate the main consumption time period DTprin, comprising the numerical value of this main consumption time period DTprin. Alternatively, or additionally, the main symbols may display this main consumption time period DTprin in relation to the reference time period DTRef. The main symbols then comprise, for example, a bar graph, a disk, a scale, or the like.

The main symbols indicating the main consumption time period DTprin may be displayed on a screen present on the electrical energy source, or on a remote screen, for example a screen in the cockpit of an aircraft provided with the monitored electrical energy source.

As a result of this main display of the main symbols, an operator, or the pilot of an aircraft, is able to quickly view the main consumption time period DTprin available for the electrical energy source, depending on the parameter or parameters of the source, and in particular its charge level, and can then optimize the use of the electrical energy supplied by the electrical energy source.

Moreover, the main symbols may comprise an alert zone corresponding to a predetermined final consumption time period DTfin wherein the electrical energy source is able to supply an electric current carrying the reference electrical power PRef before the electrical energy source no longer comprises any electrical energy, and is then not able to supply electrical energy.

The alert zone is shown, for example, in a specific color different to the color used for the other main symbols. This alert zone therefore helps to clearly and distinctly indicate the last electrical energy percentages that the electrical energy source can supply.

The method according to the disclosure may also comprise estimating at least one additional consumption time period DTcomp wherein the electrical energy source is able to supply an electric current carrying an additional electrical power Pcomp different to the reference electrical power PRef, as a function of the parameter or parameters of the electrical energy source and the additional electrical power Pcomp, and displaying an additional display of additional symbols indicating the additional consumption time period DTcomp.

Indeed, the electrical energy source is not always used to deliver the reference electrical power PRef. Therefore, when the electrical energy source is used to deliver a different electrical power, for example an electrical power less than the reference electrical power PRef, an operator knows that the electrical energy source can deliver such an electrical power for a time period greater than the main consumption time period DTprin, without any further information.

Similarly, if the electrical energy source delivers an electrical power greater than the reference electrical power PRef, an operator can see, by virtue of the additional symbols, that the electrical energy source can deliver such an electrical power for a time period less than the main consumption time period DTprin.

The additional display of the additional symbols can therefore indicate one or more additional consumption time periods DTcomp associated respectively with one or more additional electrical powers Pcomp. This additional display advantageously gives the operator a more accurate idea of the time period wherein the electrical energy source can supply such an electrical power, even if this electrical power is not exactly equal to one of the additional electrical powers Pcomp whose additional consumption time period DTcomp is displayed. This additional electrical power Pcomp may, for example, correspond to a particular predetermined use.

The method according to the disclosure may also comprise calculating a value of electrical power received or delivered by the electrical energy source as a function of the parameter or parameters, and displaying a supplementary display of the value of received or delivered electrical power.

This value of received or delivered electrical power may be determined using the second parameters of the electric current flowing in the electrical energy source, using the electrical voltage and the electrical intensity of this electric current. This value of received or delivered electrical power may also be determined using measurements at the electric machine that is supplied by the source, for example using measurements of an engine torque of an output shaft of the electric machine and a speed of rotation of this output shaft.

The operator can therefore know instantly if the source is receiving an electric current, to be recharged, or if it is supplying an electric current carrying an electrical power, and also the amount of energy it is receiving or delivering. The operator therefore knows, for example, the delivered electrical power in relation to the reference electrical power PRef, and the operator can estimate the consumption time period of this delivered electrical power in relation to the main consumption time period DTprin that the pilot knows.

In order to make it easier to find out how the electrical energy source is operating, when the electrical energy source is receiving an electrical power, the value of the received electrical power is displayed in a first color, and when the electrical energy source is delivering an electrical power, the value of the delivered electrical power may be displayed in a second color different to the first color.

Moreover, the electrical energy source may equip an aircraft comprising a hybrid power plant and a lift rotor rotated by the hybrid power plant via a mechanical transmission system, the hybrid power plant comprising at least one engine, at least one electric machine, and the electrical energy source electrically connected to the electric machine or machines, via an electrical connection system.

In this case, the method may comprise determining flows of energy flowing in the mechanical transmission system and the electrical connection system, and displaying a transfer display, for example on a screen present in the cockpit of the aircraft, of transfer symbols provided with figurines, respectively representing the lift rotor, the engine or engines, the electric machine or machines, and the electrical energy source, as well as arrows representing the flows of energy between the lift rotor and, respectively, the engine or engines, and the electric machine or machines, and between the electrical energy source and the electric machine or machines.

The pilot of the aircraft therefore has an overview of the exchange of mechanical powers and electrical powers in the hybrid power plant and towards the lift rotor.

Furthermore, when several parameters of the electrical energy source are acquired during the step of acquiring of at least one parameter of the electrical energy source, the method according to the disclosure may comprise identifying the most penalizing parameter among the parameters. The main consumption time period DTprin is then advantageously calculated on the basis of this most penalizing and most critical of the acquired parameters.

The displayed main consumption time period DTprin is thus minimized, by limiting, or even avoiding, the risks that the actual duration of availability of the reference electrical power PRef is less than this main consumption time period DTprin, depending on future changes in the parameters. In addition to the parameters relating to the electrical energy source, environmental parameters, such as the humidity level or the vibrations experienced by the energy source, for example, can also be taken into account.

The method according to the disclosure incorporates a mechanism for evaluating the most penalizing parameter for the energy source from among the acquired parameters. This mechanism uses thresholds for each of the acquired parameters. These thresholds are limit values, or even critical values, for each parameter and are based, for example, on safety standards, manufacturer specifications, or other intrinsic and/or functional characteristics of the energy source. A so-called 'normal' threshold and a so-called 'critical' threshold may be associated with the same parameter, with exceeding the critical threshold possibly causing degradation of the energy source.

The thresholds can be predetermined. Alternatively, these thresholds can be determined in real time, for example as a function of certain parameters of the energy source and/or the environment, during a step of determining thresholds.

The step of identifying the most penalizing parameter among the parameters may then comprise a step of comparing the acquired parameters with these respective thresholds. The most penalizing parameter is then estimated, the most penalizing parameter being, for example, the parameter that exceeds its corresponding threshold by the greatest amount or percentage, or the parameter that has the smallest amount or percentage difference from this threshold if no threshold is exceeded.

This main consumption time period DTprin determined as a function of the most penalizing parameter is thus minimized as a function of the value of each of the acquired parameters in relation to the respective thresholds corresponding to these parameters.

Alternatively, or additionally, the method according to the disclosure applied to an electrical energy source of such an aircraft may comprise determining at least one characteristic of the aircraft, estimating at least one rate of sink and at least one distance that can be reached before reaching the ground, using only an electrical energy that the electrical energy source can deliver, and displaying a descent display, for example on a screen present in the cockpit of the aircraft, of descent symbols representing at least one trajectory of descent of the aircraft as a function of the rate of sink of the aircraft and the distance that the aircraft can reach with a view to landing. The descent symbols comprise at least a trajectory of descent of the aircraft formed with a rate of sink and an associated reachable distance.

The rate of sink of the aircraft and the reachable distance of the aircraft are determined, in particular, as a function of said at least one parameter of the electrical energy source, the electrical power supplied by the electrical energy source to electric the machine, the characteristic or characteristics of the aircraft, for example using laws or charts stored in a memory of the calculator or a memory connected to the calculator.

The pilot therefore knows one or more trajectories of descent for reaching the ground, associated with a reachable distance, with the associated rate of sink, in particular with a view to landing. Knowing this is particularly useful in the event that the lift rotor is driven only by the electric machine or machines supplied by the electrical energy source, for example in the event of failure of the engine or engines.

Moreover, when making this estimation, several rates of sink and several reachable distances may be estimated, being associated respectively with several different electrical powers that the electrical energy source can deliver. The descent symbols then comprise several trajectories of descent associated respectively with these rates of sink and these reachable distances. The descent symbols may also comprise a value of the electrical power allowing the displayed rate of sink and reachable distance associated with each trajectory of descent to be obtained.

A rate of sink of the aircraft is determined, for example, using charts or laws stored in a memory of the calculator or in a memory connected to the calculator. These laws or charts, in particular comprising polars characterizing the flight and the performances of the aircraft, take into account one or more characteristics of the aircraft and the electrical power supplied by the electrical energy source to the electric machine or machines.

A trajectory of descent may comprise only one slope according to the estimated rate of sink if the energy level of the electrical energy source is sufficient for the source to deliver the electrical power associated with this estimated rate of sink until the aircraft reaches the ground. Alternatively, a trajectory of descent may comprise a first slope according to this estimated rate of sink corresponding to a flight during the consumption time period of the electrical energy of the electrical energy source and a second slope with an autorotation rate of sink to the ground corresponding to a flight without driving power. An electrical energy store may also be saved specifically for consumption during the actual landing phase, in order to slow down the descent of the aircraft, for example.

The characteristic or characteristics of the aircraft may be chosen from a height of the aircraft in relation to the ground, a mass of the aircraft, a forward speed of the aircraft and a vertical speed of the aircraft, for example.

Moreover, the rate of sink and the reachable distance may be corrected as a function of a wind speed experienced by the aircraft. Indeed, if there is a strong headwind, the reachable distance will be reduced. The wind speed value may be known and extracted from a weather report by the calculator and/or available at an avionics system of the aircraft.

The method according to the disclosure may also comprise determining a maximum reachable distance equal to the greatest of the previously estimated reachable distances, the maximum reachable distance being associated with an optimal rate of sink and an optimal electrical power. Knowing this maximum reachable distance helps a pilot of the aircraft estimate the reachable landing point the furthest from its current position, irrespective of the surrounding terrain.

The method according to the disclosure may then comprise selecting a trajectory chosen from the displayed trajectories of descent and the descent symbols comprise a descent reference mark representative of the rate of sink corresponding to the chosen trajectory on an artificial horizon instrument of the aircraft.

The pilot of the aircraft can therefore check on the artificial horizon instrument whether the actual rate of sink of the aircraft complies with and/or is consistent with the rate of sink associated with the trajectory chosen to reach a landing area.

Alternatively, or additionally, the method according to the disclosure may comprise selecting a trajectory chosen from the displayed trajectories of descent and the descent symbols comprise a power reference mark representative of the electrical power corresponding to the chosen trajectory on a power indication instrument of the aircraft.

The pilot of the aircraft can therefore check on the power indication instrument whether the power consumed by the aircraft complies with and/or is consistent with the electrical power associated with the trajectory chosen to reach a landing area. Such a power indication instrument is, for example, a first-limitation indicator or a collective pitch indicator.

The method may also comprise localizing a current position of the aircraft, for example by means of a global positioning system, and the descent symbols comprise a display, superposed on a map of the aircraft surroundings, of at least one distance that is reachable from the current position of the aircraft, the map being stored, for example, in a memory of the aircraft. The displayed reachable distance or distances are chosen from the estimated reachable distances.

The pilot of the aircraft can therefore clearly see, on the map, the distance that the aircraft can travel in the event of failure of the engine or engines, using only the electrical energy that the electrical energy source can supply. The pilot can therefore choose, for example, a landing zone for an emergency landing depending on the distance the aircraft can reach.

The object of the present disclosure is also an electrical energy source comprising:

at least one electrical energy storage device;

at least one sensor; and a calculator.

This electrical energy source is capable of delivering a reference electrical power PRef for a predetermined reference time period DTRef for a predetermined reference charge level NRef and can apply the method as previously described, the calculator being configured to implement this method.

The present disclosure lastly relates to an aircraft comprising a hybrid power plant and a lift rotor rotated by the hybrid power plant via a mechanical transmission system, the hybrid power plant comprising at least one engine, at least one electric machine, and an electrical energy source electrically connected to the electric machine, via an electrical connection system. The electrical energy source is capable of delivering a reference electrical power PRef for a predetermined reference time period DTRef for a predetermined reference charge level NRef and comprises at least one electrical energy storage device, at least one sensor and a calculator.

The electrical energy source may apply the method as described previously, the calculator being configured to implement this method, for example. The calculator may be dedicated to implementing this method or indeed shared in order to perform other functions in the aircraft, or indeed be integrated into an avionics system of the aircraft.

BRIEF DESCRIPTION OF THE DRAWINGS

The disclosure and its advantages appear in greater detail in the context of the following description of embodiments given by way of illustration and with reference to the accompanying figures, wherein:

FIGS. 4 to 11 are views of examples of the displays according to the method according to the disclosure.

DETAILED DESCRIPTION

Elements that are present in more than one of the figures are given the same references in each of them.

Figure 1:
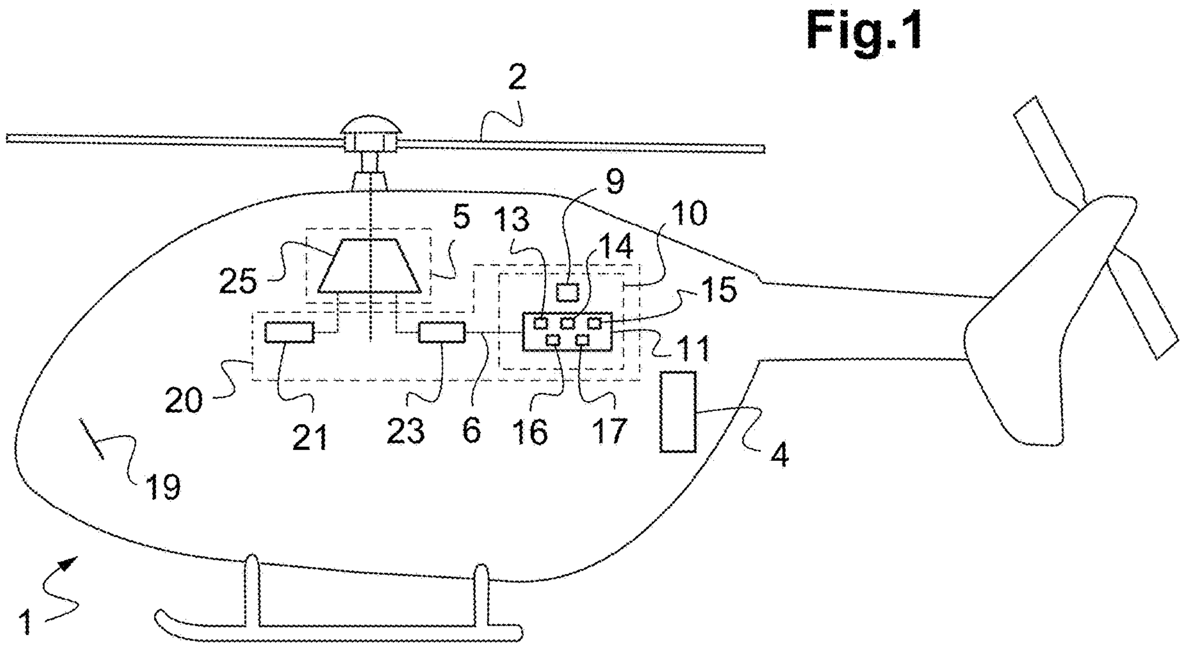
FIG. 1 is a view of an aircraft provided with an electrical energy source according to the disclosure.
Figure 2:
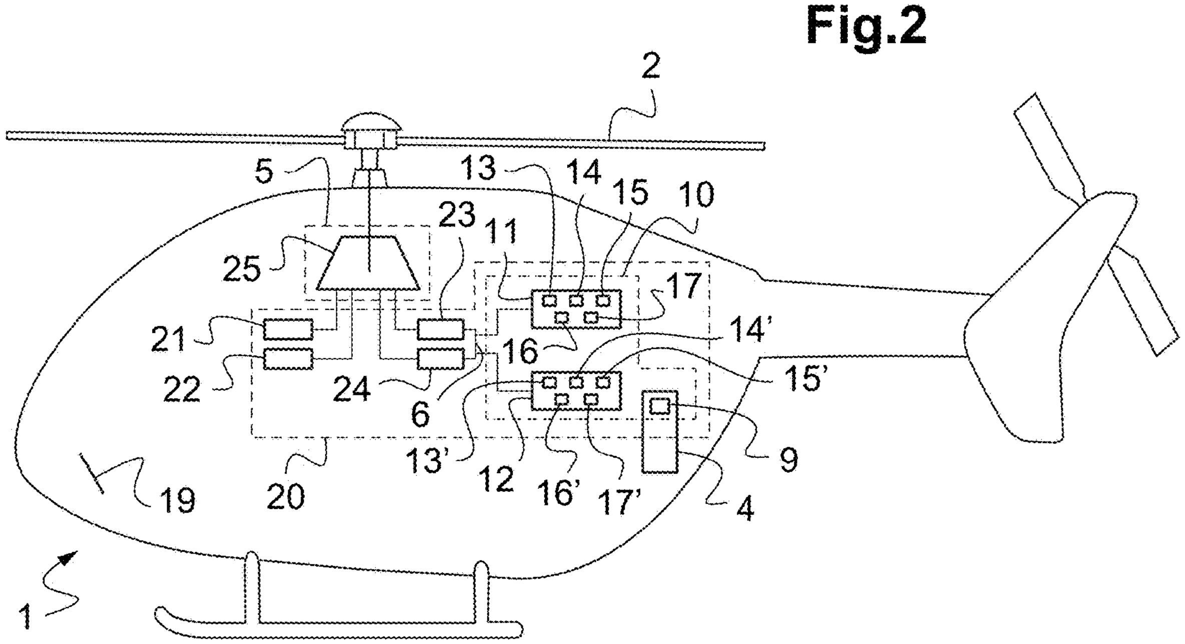
FIG. 2 is a view of an aircraft provided with an electrical energy source according to the disclosure.

FIGS. 1 and 2 show examples of electrical energy sources 10 equipping a hybrid power plant 20 of an aircraft 1.

Irrespective of the embodiment, the electrical energy source 10 comprises at least one electrical energy storage device 11,12, at least one sensor 13-17, and a calculator 9.

According to a first example shown in FIG. 1, the electrical energy source 10 comprises a single electrical energy storage device 11. According to a second example shown in FIG. 2, the electrical energy source 10 comprises two electrical energy storage devices 11,12 arranged electrically in parallel with each other.

In the context of the disclosure, an electrical energy source 10 may also comprise more than two electrical energy storage devices 11, 12. When a source 10 comprises at least two electrical energy storage devices 11, 12, they may be arranged electrically in parallel with each other and/or in series.

A storage device 11, 12 may comprise, for example, an electric battery, that may be rechargeable, or a supercapacitor.

Irrespective of the examples shown, the electrical energy source 10 is capable of delivering an electric current carrying a reference electrical power PRef for a predetermined reference time period DTRef for a predetermined reference charge level NRef. The charge level of the source 10 characterizes the amount of electrical energy that the source 10 comprises. This electric current is characterized by an electrical intensity and an electrical voltage.

The electrical energy source 10 is naturally also able to deliver an electrical power different to the reference electrical power PRef. For example, the reference time period DTRef may be equal to two minutes and the reference charge level NRef may be equal to eighty percent (80%).

The sensors 13-17 of the electrical energy source 10 measure one or more parameters of this electrical energy source 10. The sensors 13-17 may, in particular, be arranged at the electrical energy source 10 in order to measure one or more first parameters that relate directly to the electrical energy source 10 itself, and one or more second parameters that relate to the electric current flowing in the electrical energy source 10.

Such a sensor 13-17 can supply a raw signal carrying raw measurements made by this sensor 13-17. Such a sensor 13-17 may also comprise an integrated calculator to process these raw measurements, for example via conventional filtering or sampling, or the application of transformations, and supply a processed signal carrying these processed raw measurements.

For example, an electrical energy storage device 11,12 may comprise a temperature sensor 13,13', possibly provided with a thermocouple, for measuring an internal temperature of this electrical energy storage device 11,12.

Additionally, or alternatively, an electrical energy storage device 11,12 may comprise a charge sensor 14,14' for measuring an electrical charge level of this electrical energy storage device 11,12, i.e., the amount of electrical energy that it comprises.

Additionally, or alternatively, an electrical energy storage device 11,12 may comprise an ageing sensor 15,15' for measuring a level of ageing of this electrical energy storage device 11,12. Such an ageing sensor 15,15' may, for example, comprise a calculator configured to calculate the level of ageing of the electrical energy storage device 11, 12 as a function of internal parameters, such as its internal resistance and its state of charge, for example. The level of ageing may be taken into account in order to determine the value of the maximum electrical intensity of an electric current that this electrical energy storage device 11,12 can supply.

Additionally, or alternatively, an electrical energy storage device 11,12 may comprise an intensity sensor 16,16', possibly provided with an ammeter, for measuring an electrical intensity of an electric current flowing in the electrical energy storage device 11,12, i.e., entering or leaving this storage device 11,12.

Additionally, or alternatively, an electrical energy storage device 11,12 may comprise a voltage sensor 17, 17', possibly provided with a voltmeter, for measuring an electrical voltage at the terminals of the electrical energy storage device 11, 12, and corresponding to the electrical voltage of the electric current entering or leaving the electrical energy storage device 11,12.

An electrical energy storage device 11, 12 may also comprise other sensors, not shown in the figures, for measuring, for example, an internal resistance, an impedance and/or a residual capacity of the electrical energy storage device 11, 12.

The calculator 9 may be dedicated solely to the operation of the source 10. Alternatively, the calculator 9 may be shared, carrying out other functions of the aircraft 1, and may possibly be integrated into an avionics system 4 of the aircraft 1, as shown in FIG. 2. In both cases, the calculator 9 is connected via wired or wireless means to the sensors 13-17 of the electrical energy source 10 in order to receive the signals emitted by the sensors 13-17.

By way of example, the calculator 9 may comprise at least one processor and at least one memory, at least one integrated circuit, at least one programmable system, or at least one logic circuit, these examples not limiting the scope to be given to the term "calculator". The term "processor" may refer equally to a central processing unit or CPU, a graphics processing unit or GPU, or a known digital unit.

The electrical energy source 10 may also comprise a display unit 19, for example a screen, for displaying several symbols comprising one or more indications of the charge level of the electrical energy source 10. This display unit 19 may, for example, be remote, in the cockpit of the aircraft 1, when the electrical energy source 10 equips a hybrid power plant 20 of this aircraft 1. Alternatively, the display unit 19 may be integrated into the electrical energy source 10.

In all cases, the display unit 19 is connected to the calculator 9 via wired or wireless means.

Electrical or optical, analog or digital signals may be transmitted by the sensors 13-17 to the calculator 9 and by the calculator 9 to the display unit 19.

As disclosed above, the electrical energy source 10 may equip a hybrid power plant 20 of an aircraft 1. The hybrid power plant 20 rotates one or more rotors 2, for example a lift rotor, a rear rotor or a propeller, via a mechanical transmission system 5. The mechanical transmission system 5 may in particular comprise a main gearbox 25.

The hybrid power plant 20 may comprise at least one engine 21,22 mechanically connected to the mechanical transmission system 5, and at least one electric machine 23,24 also mechanically connected to the mechanical transmission system 5.

The electric machine or machines 23,24 are electrically connected to the electrical energy source 10, via an electrical transmission system 6, so as to be supplied with an electric current delivered by the electrical energy source 10.

Such an electric machine 23,24 may operate in motor mode to transform an electrical energy supplied by the electrical energy source 10 into mechanical energy transmitted to the lift rotor 2, via the mechanical transmission system 5. The electric machine 23, 24 may also operate in generator mode to transform a mechanical energy supplied by the engine or engines 21, 22 and/or the lift rotor 2, via the mechanical transmission system 5, into electrical energy transmitted to the electrical energy source 10 via an electrical transmission system 6, and intended to recharge the electrical energy storage device or devices 11, 12 of the source 10.

Therefore, the engine or engines 21, 22 and the electric machine or machines 23,24 may jointly or separately rotate the rotor 2, via the mechanical transmission system 5. The electrical energy source 10 may in particular be used to compensate for a failure of the engine or engines 21, 22, supplying the electric machine or machines 23,24 in order to rotate the rotor 2.

According to the example shown in FIG. 1, the hybrid power plant 20 comprises one engine 21 and one electric machine 23. According to the example shown in FIG. 2, the hybrid power plant 20 comprises two engines 21, 22 and two electric machines 23,24. Alternatively, such a hybrid power plant 20 may comprise one or more engines 21, 22 and/or one or more electric machines 23,24.

The aircraft 1 also comprises an avionics system 4 that centralizes various items of information relating to the flight and to the operation of the aircraft 1, obtained using conventional sensors and/or calculators (not shown). The avionics system 4 may then display this information to a pilot of the aircraft 1. This information centralized by the avionics system 4 comprises, for example, a height in relation to the ground, a forward speed and a vertical speed of the aircraft 1 respectively measured by dedicated sensors, i.e., a height sensor, such as a radio altimeter, for example, a forward speed sensor such as an anemometer and a vertical speed sensor such as a variometer.

When the calculator 9 is dedicated solely to the operation of the source 10, the calculator 9 is connected to this avionics system 4 via wired or wireless means. Such information relating to the flight and to the operation of the aircraft 1 can thus be transmitted to the calculator 9 by means of electrical or optical, analog or digital signals.

Moreover, instructions or a computer program may be stored in a memory of the calculator 9 or in a memory connected to this calculator 9. The calculator 9 can then execute these instructions or this program in order to implement a method for monitoring an energy level of the electrical energy source 10.

Figure 3:
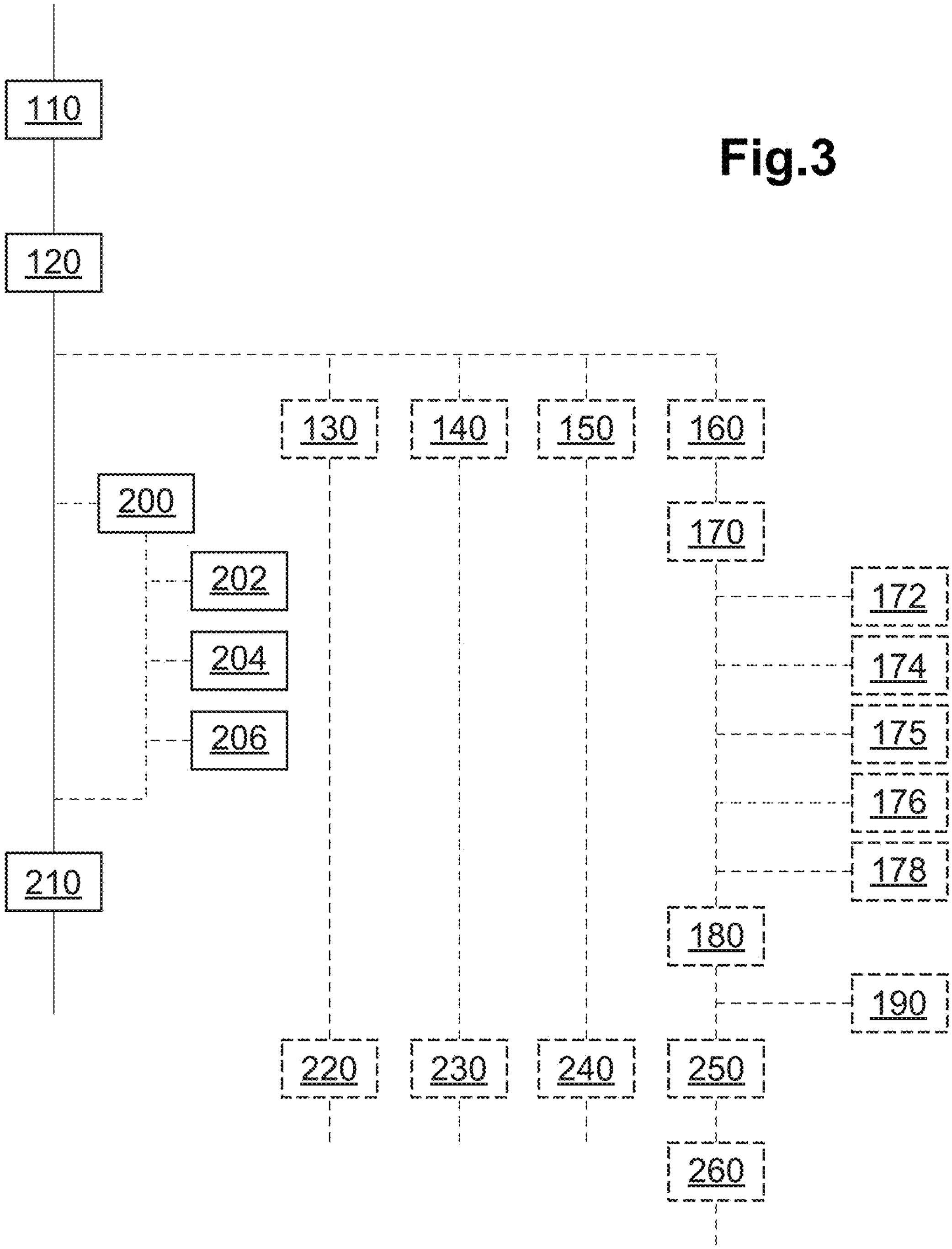
FIG. 3 is an overview diagram of a method according to the disclosure.

FIG. 3 shows a block diagram of this method for monitoring an energy level of an electrical energy source 10. This method may comprise the following steps.

The method first comprises using the sensors 13-17, 13'-17' to acquire 110 at least one parameter of the electrical energy source 10.

Therefore, one or more first parameters relating to the electrical energy source 10, and in particular relating to the electrical energy storage device or devices 11,12, and/or one or more second parameters relating to the electric current flowing in the electrical energy source 10, and in particular relating to the electric current flowing in the electrical energy storage device or devices 11,12, are acquired. Signals carrying these parameters are, for example, transmitted by the sensors 13-17, 13'-17' to the calculator 9, and possibly stored in a memory of the calculator 9 or connected to the calculator 9.

During this acquisition 110, if the electrical energy source 10 comprises at least two electrical energy storage devices 11,12, at least one parameter is acquired for each of these storage devices 11,12.

Following this acquisition 110, the method comprises calculating 120, with the calculator 9, as a function of the previously acquired parameter or parameters of the electrical energy source 10, a main consumption time period DTprin wherein the electrical energy source 10 is able to supply an electric current carrying the reference electrical power PRef. The main consumption time period DTprin is calculated using this or these parameters, and one or more laws or charts stored in a memory of the calculator 9 or in a memory connected to the calculator 9. The main consumption time period DTprin may in particular be equal to the amount of energy that the electrical energy source comprises divided by the reference electrical power PRef, the amount of energy being defined by the charge level of the source and possibly by its temperature and its ageing.

The method then comprises displaying a main display 210, on the display unit 19, of main symbols 31 indicating the main consumption time period DTprin.

The main symbols 31 may indicate the main consumption time period DTprin, displaying this main consumption time period DTprin in relation to the reference time period DTRef. The reference time period DTRef has previously been stored in a memory of the calculator 9 or in a memory connected to the calculator 9.

The main symbols 31 may be in various forms, such as a bar graph, a disk, a scale, or the like.

FIG. 4 shows a first example of main symbols 31 comprising a bar graph comprising eight barres each representing a time period equal to one eighth of the reference time period DTRef. The total of the bars thus represents the reference time period DTRef corresponding to a charge level of the source 10 equal to or greater than the reference charge level NRef.

Therefore, the squares that are filled in together represent the main consumption time period DTprin whereas the square or squares that are empty correspond to the amount of electrical energy of the source 10 that has already been consumed. According to this first example, the electrical energy source 10 has a main consumption time period DTprin equal to half of the reference time period DTRef.

FIG. 5 shows a second example of the main symbols 31 comprising a disk. A disk that is full, i.e., completely filled in, represents the reference time period DTRef corresponding to a charge level of the source 10 equal to or greater than the reference charge level NRef. When the main consumption time period DTprin is less than the reference time period DTRef, an angular sector appears empty, for example, and corresponds to the amount of electrical energy of the source 10 that has already been consumed. According to this first example, the electrical energy source 10 has a main consumption time period DTprin equal to three quarters of the reference time period DTRef.

Irrespective of these forms, the main symbols 31 may also comprise main indices 36 comprising numerical values corresponding to different values of the main consumption time period DTprin, as shown in FIGS. 4 and 5.

Moreover, the main symbols 31 may comprise an alert zone 37 corresponding to a final consumption time period DTfin wherein the electrical energy source 10 is able to supply an electric current carrying the reference electrical power PRef before the electrical energy source 10 is no longer able to supply electrical energy. Such an alert zone 37 is shown with a hatched pattern in FIGS. 4 and 5, and corresponds to one eights of the reference time period DTRef, for example being equal to 15 seconds. The final consumption time period DTfin is predetermined, and therefore independent of the parameter or parameters of the source 10. In practice, such an alert zone 37 may be represented using a distinctive color, for example orange or red, different to the color used to fill the boxes or angular sectors of the graphic representation of this main symbol 31.

This main display 210 of the main symbols 31 enables an operator or a pilot of the aircraft 1 to clearly and quickly view the main consumption time period DTprin wherein the source 10 can supply the reference electrical power PRef. The pilot may then optimize the use of the electrical energy that the electrical energy source 10 comprises, in particular as a function of the time period and the requirements of the flight until landing, in the case of an aircraft 1. The pilot may, for example, use some of this electrical energy, while saving an amount of electrical energy in order to compensate for a possible failure of one or more engines 21,22.

This main display 210 advantageously takes into account the actual conditions of use of the electrical energy source 10 by using the parameters acquired from the source 10, and in particular its temperature, its charge level and its level of ageing, as well as the electric current flowing in the source 10, whether it is supplying an electric current to drive the rotor 2 or receiving an electric current to recharge the electrical energy storage device or devices 11,12.

Furthermore, the method according to the disclosure may comprise estimating 130 at least one additional consumption time period DTcomp wherein the electrical energy source 10 is able to supply an electric current carrying an additional electrical power Pcomp different to the reference electrical power PRef. This estimation is carried out by the calculator 9, as a function of the parameter or parameters of the electrical energy source 10 and the additional electrical power Pcomp. The method according to the disclosure may also comprise displaying an additional display 220, on the display unit 19, of additional symbols 32 indicating this additional consumption time period DTcomp associated with this additional electrical power Pcomp. The calculator 9 may, for example, apply a rule of three between the additional electrical power Pcomp, the reference electrical power PRef and the main consumption time period DTprin in order to estimate the additional consumption time period DTcomp.

The electrical energy source is not always used to deliver the reference electrical power PRef. Therefore, it is not always straightforward for an operator or a pilot of the aircraft 1 to estimate the time period wherein the electrical energy source 10 is able to deliver an electrical power different to the reference electrical power PRef, this different electrical power possibly being greater than or less than the reference electrical power PRef. The additional display 220 of additional symbols 32 advantageously makes it possible to indicate one or more additional consumption time periods DTcomp associated respectively with one or more additional electrical powers Pcomp, allowing the operator to know the exact duration of use of such an additional electrical power Pcomp and to have a more accurate idea of the duration of use of an electrical power different to the reference electrical power PRef and an additional electrical power Pcomp, this electrical power being able to be situated between an additional electrical power Pcomp and the reference electrical power PRef or between two additional electrical powers Pcomp.

FIG. 6 shows the main symbols 31 in the form of a bar graph provided with the main indices 36, and the additional display 32 for two additional electrical powers Pcomp respectively equal to 50% and 75% of the reference electrical power PRef. The additional display 32 also comprises additional indices 38 comprising numerical values corresponding to different values of the additional consumption time period DTcomp associated respectively with these additional electrical powers Pcomp.

Moreover, the method according to the disclosure may comprise using the calculator 9 to calculate 140 a value of electrical power received or delivered by the electrical energy source 10 as a function of the at least one parameter of the electrical energy source 10, and displaying a supplementary display 230, on the display unit 19, of this value 33 of received or delivered electrical power.

The operator or the pilot of the aircraft 1 can therefore easily see whether the electrical energy source 10 is delivering electrical power for driving, for example, the lift rotor 2, or receiving electrical power transmitted by the electric machine or machines 23,24, and the value of this delivered or received electrical power.

Moreover, in order to make it easier for the operator or pilot to identify the operating mode of the electrical energy source 10, different colors may be used for the supplementary display 230 of this value of received or delivered electrical power, depending on whether the electrical energy source 10 is receiving or delivering this electrical power. A "–" sign and possibly a "+" sign may also be displayed in front of the value of the received or delivered electrical power, depending on whether the electrical energy source 10 is receiving or delivering this electrical power.

The main symbols 31 shown in FIG. 6 also comprise the supplementary display 230 of a value of electrical power with a "–" sign corresponding to the electrical power received by the electrical energy source 10.

In the specific case wherein the electrical energy source 10 equips an aircraft 1, the method may comprise determining 150, with the calculator 9, the flows of energy flowing in the mechanical transmission system 5 and the electrical connection system 6. The aim of this determination 150 is essentially to determine the direction of flow of the flows of energy in the mechanical transmission system 5 and the electrical connection system 6, i.e., between the lift rotor 2 and the engine or engines 21, 22, the electric machine or machines 23,24 and between the electric machine or machines 23,24 and the electrical energy source 10. The flow of energy in the mechanical transmission system 5 flows in a single direction from the engines 21, 22 towards the rotor 2, whereas it may flow in two directions between the electric machine or machines 23,24 and the rotor 2. The flow of energy in the electrical connection system 6 flows in two directions.

The directions of the flows of energy in the mechanical transmission system 5 may be defined, for example, using measurements of engine torque on the engine or engines 21, 22 and on the electric machine or machines 23, 24, using torquemeters. The direction of the flows of energy in the electrical connection system 6 may be defined using one or more second parameters that relate to the electric current flowing in the electrical energy source 10.

Figure 7:
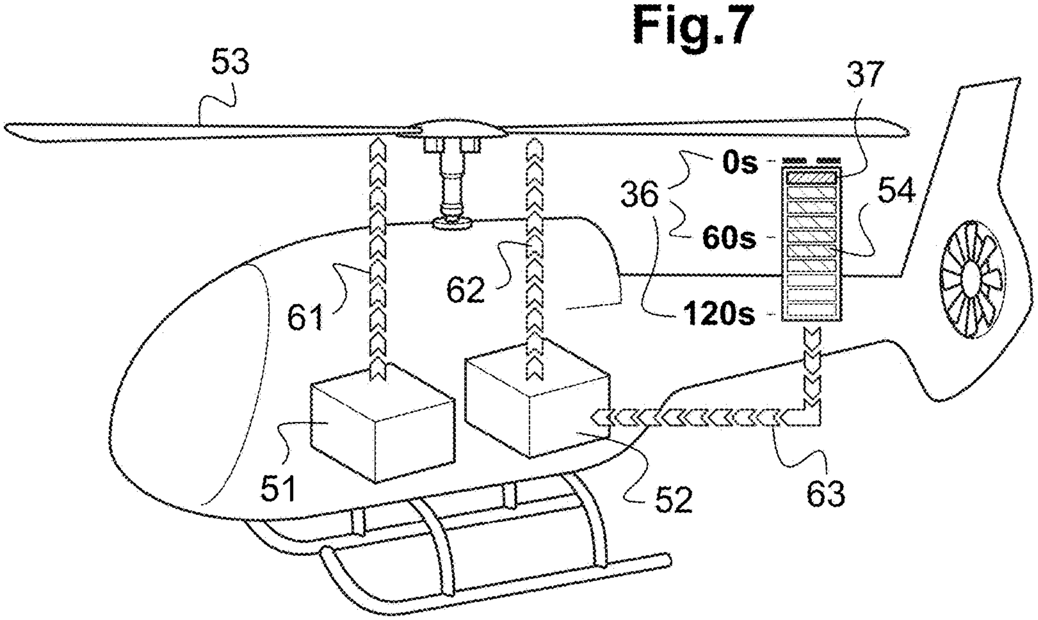

The method then comprises displaying a transfer display 240, on the display unit 19, of transfer symbols 34 provided with figurines 51-54, respectively representing the lift rotor 2, the engine or engines 21,22, the electric machine or machines 23,24 and the electrical energy source 10, and arrows 61-63 representing the direction of flow of these flows of energy, as shown in FIG. 7.

FIG. 7 shows the case of the aircraft 1 of FIG. 1 during operation, wherein the engine 21, represented by a first figurine 51, and the electric machine 23, represented by a second figurine 52, together rotate the lift rotor 2, represented by a third figurine 53, the electrical energy source 10, represented by a fourth figurine 54, supplying electricity to the electric machine 23. The main symbols 31 may be displayed at the same time as these transfer symbols 34 in order to indicate, in particular, the main consumption time period DTprin.

These transfer symbols 34 enable the pilot of the aircraft 1 to easily and instantly view the energy exchanges in the mechanical transmission system 5 and the electrical transmission system 6, and the operating mode of the electrical energy source 10, either as a supplier or receiver of energy.

In the specific case wherein the electrical energy source 10 equips the aircraft 1, the method may comprise determining 160 characteristics of the aircraft 1, with the avionics system 4 and/or conventional sensors of the aircraft 1 that are able to determine these characteristics, such as the height of the aircraft 1 relative to the ground, its forward speed and its vertical speed, for example.

The calculator 9 may then estimate 170 at least one rate of sink, and then at least one distance the aircraft 1 can reach when the aircraft 1 is using only the electrical energy delivered by the electrical energy source 10. This estimation 170 is made, for example, using dedicated laws or charts stored in a memory of the calculator 9 or in a memory connected to the calculator 9. To this end, the calculator 9 receives signals carrying information relating to the previously measured characteristic or characteristics of the aircraft 1, and information that relates to the parameter or parameters of the electrical energy source 10, and may estimate one or more rates of sink of the aircraft as a function of this or these characteristics of the aircraft 1, the parameter or parameters of the electrical energy source 10 and one or more electrical powers that the electrical energy source 10 can supply to the electric machine 23,24.

This or these rates of sink may be determined using charts or laws stored in a memory of the calculator 9 or in a memory connected to the calculator 9. These laws or charts may, for example, comprise polar curves characterizing the flight and the performances of the aircraft 9.

The calculator 9 applies the characteristics of the aircraft 1 and an electrical power supplied by the electrical energy source 10 to the electric machine or machines 23, 24 to these laws or charts in order to deduce therefrom the rate of sink associated with this electrical power. A speed of descent of the aircraft 1 using this electrical power and applying this rate of sink may be determined simultaneously by the calculator 9 using these laws and charts as a function of the characteristics of the aircraft 1 and the electrical power supplied by the electrical energy source 10. This operation may be repeated several times with different electrical powers.

Next, one or more distances that can be reached by the aircraft 1 before reaching the ground are calculated by the calculator 9 as a function of the estimated rate or rates of sink, the parameter or parameters of the electrical energy source 10 and the characteristic or characteristics of the aircraft 1, in particular the height of the aircraft 1 relative to the ground. The consumption time period associated with the electrical power used to determine the rate of sink, and the speed of descent corresponding to this electrical power and to this rate of sink, are also taken into consideration, possibly along with an autorotation rate of sink of the aircraft 1.

Indeed, a trajectory of descent 40 to the ground may be constructed by the calculator 9 in order to determine the reachable distance. The reachable distance is then equal to the horizontal distance between the point of origin of this trajectory of descent, i.e., the current position of the aircraft 1, and the point of destination of this trajectory of descent to the ground.

This trajectory of descent 40 may comprise only a slope 45 according to the estimated rate of sink if the consumption time period associated with the electrical power used to determine the rate of sink allows the aircraft 1 to reach the ground directly at the associated speed of descent.

If not, the trajectory of descent 40 comprises a first slope 46 according to this estimated rate of sink corresponding to a flight during this consumption time period and at the speed of descent, and a second slope 47 at an autorotation rate of sink to the ground corresponding to a flight without driving power. The autorotation rate of sink may be predetermined, before the flight, and possibly adjusted as a function of the current mass of the aircraft 1, using the laws or charts.

Furthermore, an electrical energy store may be saved specifically for consumption during the actual landing phase, in order to slow down the descent of the aircraft 1, for example when it makes contact with the ground.

The estimation 170 may comprise one or more sub-steps, such as a sub-step of constructing 172 this trajectory of descent 40 and/or a sub-step of determining 174 the speed of descent associated with the estimated rate of sink and with the corresponding electrical power. A sub-step of calculating 175 the consumption time period associated with the electrical power corresponding to the estimated rate of sink may also be carried out. This calculation sub-step 175 is carried out in the same way as the estimation 130 of at least one additional consumption time period DTcomp, considering the additional electrical power Pcomp to be equal to the electrical power corresponding to the estimated rate of sink.

A sub-step of calculating 176 the autorotation rate of sink may also be carried out by the calculator 9, as a function of a current mass of the aircraft 1, supplied, for example, by the avionics system 4, and a predetermined autorotation rate of sink stored in a memory of the calculator 9 or in a memory connected to the calculator 9.

The calculator 9 may thus estimate, during this estimation 170, a single rate of sink relative to an electrical power, for example to the reference electrical power PRef, and the reachable distance corresponding to this rate of sink. Alternatively, the calculator 9 may estimate, during this estimation 170, several different rates of sink that respectively relate to several different electrical powers, for example equal to the reference electrical power PRef and to one or more additional electrical powers Pcomp, then the reachable distances corresponding to each of these rates of sink.

Figure 8:
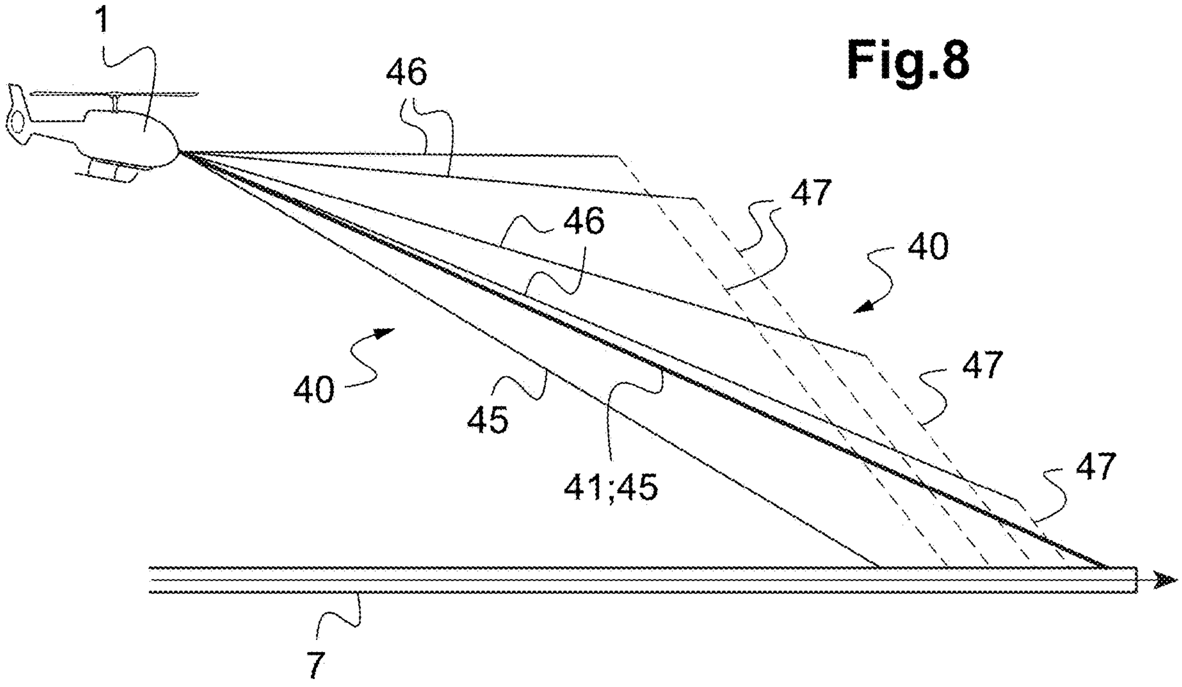

Finally, a descent display 250 is displayed on the display unit 19, of descent symbols 35 displaying at least one trajectory of descent 40 of the aircraft 1 towards the ground 7, as shown in FIG. 8.

The descent symbols 35 may then be used to display one or more trajectories 40 of the aircraft 1 constructed respectively with a pair comprising a rate of sink and the associated reachable distance.

The method may also comprise determining 178 a maximum reachable distance. This maximum reachable distance is equal to the greatest reachable distance of the estimated reachable distances and is associated with an optimal rate of sink and an optimal electrical power. The descent symbols 35 may then be used to display only a single trajectory of descent referred to as the "optimal" trajectory of descent 41 of the aircraft 1 constructed with a pair comprising the optimal rate of sink and the maximum reachable distance. Alternatively, the descent symbols 35 may be used to display several trajectories of descent 40 of the aircraft 1 constructed respectively with a pair comprising a rate of sink and the associated reachable distance, including the optimal trajectory 41 of the aircraft 1. FIG. 8 shows such an example of a descent display 250.

For each displayed trajectory 40 of the aircraft 1, the associated value or values of the electrical power, rate of sink and/or reachable distance, and indeed the associated consumption time period, may also be displayed. Moreover, the rate of sink and the reachable distance may be corrected by the calculator 9 as a function of a wind speed experienced by the aircraft 1, using laws or charts stored in a memory of the aircraft 1 taking this wind speed into account. This wind speed is, for example, supplied by the avionics system 4.

Using the descent display 250, the pilot can view, on the descent symbols 35, the trajectory or trajectories of descent 40 of the aircraft 1 to the ground 7 permitted by the electrical energy available in the electrical energy source 10. Therefore, in the event of the engine or engines 21, 22 failing, the pilot of the aircraft 1 can adapt the electrical power supplied by the electrical energy source 10 in order to reach a landing zone.

The method according to the disclosure therefore advantageously helps increase the flight safety of the aircraft 1 following a failure of the engine or engines 21,22. The determination 160 of at least one characteristic of the aircraft 1 and the estimation 170 of at least one rate of sink and at least one reachable distance, and the resulting steps, may be carried out in parallel, in particular, with the calculation 120 of the main consumption time period DTprin and the displaying of the descent display 250. The estimation 170 may alternatively be carried out independently of these steps 120,250, and therefore carried out after acquiring 110 at least one parameter of the source 10.

Figure 9:
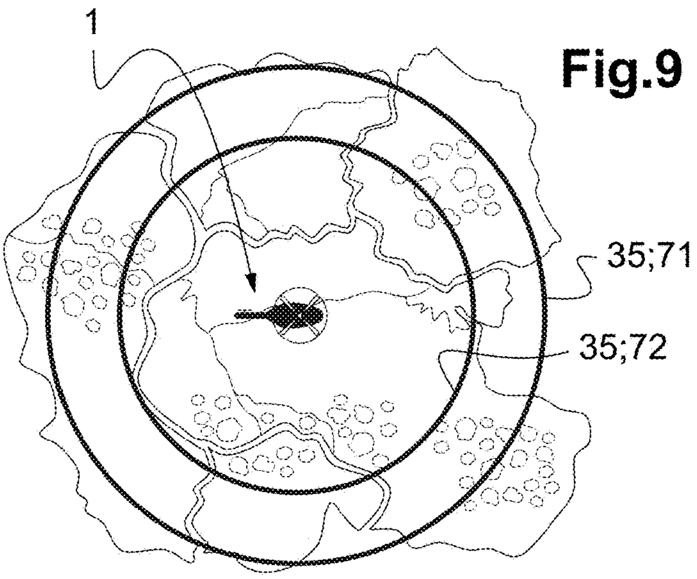

Furthermore, in order to help the pilot choose a reachable landing zone following such a failure, the method may also comprise localizing 180 a current position of the aircraft 1, for example by means of a global positioning system installed in the aircraft 1, and the descent symbols 35 comprise a display of one or more reachable distances, or indeed only the maximum distance that can be reached, superposed on a map of the surroundings of the aircraft 1, from the current position of the aircraft 1. The map of the surroundings overflown by the aircraft 1 has, for example, been stored in advance in a memory of the aircraft 1. According to the example of FIG. 9, two reachable distances are shown in the form of circles 71, 72 centered on the current position of the aircraft 1. A first circle 71 corresponds to the maximum reachable distance whereas a second circle 72 corresponds to a reachable distance associated with the reference electrical power PRef. This reachable distance associated with the reference electrical power PRef may make it possible to avoid an obstacle, such as a mountain, by firstly authorizing a substantially horizontal flight, using the reference electrical power PRef, and then descending towards the ground 7.

Finally, the method according to the disclosure may also comprise displaying an assistance display 260, on the display unit 19, of assistance symbols 80 for helping the pilot of the aircraft 1 follow a trajectory of descent 40.

Figure 10:
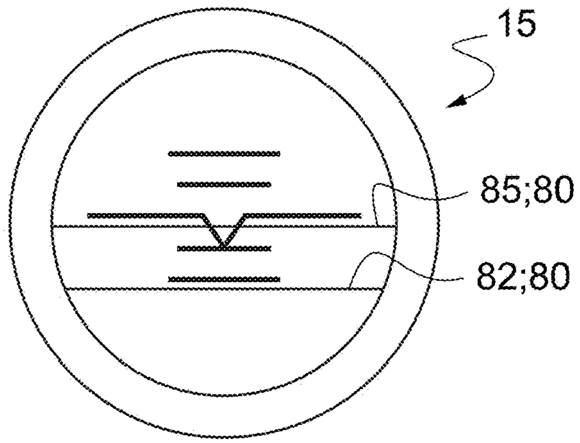

The method may, for example, comprise selecting 190 a trajectory chosen from the trajectories of descent 40 and the assistance symbols 80 may comprise an artificial horizon 85 and a descent reference mark 82 representative of the rate of sink corresponding to the chosen trajectory, as shown in FIG. 10. The descent reference mark 82 may be displayed on an artificial horizon instrument of the aircraft 1.

Figure 11:
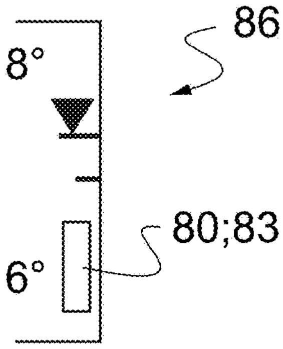

Alternatively, or additionally, the method may comprise selecting 190 a trajectory chosen from the trajectories of descent 40 and the assistance symbols 80 may comprise a power indicator 86 indicating the power of the aircraft 1 and a power reference mark 83 representative of the electrical power associated with the chosen trajectory, as shown in FIG. 11. The power reference mark 86 may be displayed on a power indication instrument of the aircraft 1.

The step of selecting 190 a trajectory chosen from the trajectories of descent 40 may, for example, be carried out automatically by the calculator 9, the chosen trajectory being, for example, the optimal trajectory. Alternatively, the step of selecting 190 a trajectory chosen from the trajectories of descent 40 may be carried out manually by the pilot using a selection device such as a screen provided with a touch panel, for example.

Finally, the method according to the disclosure may comprise, when during the acquisition 110 several parameters of the source 10 are acquired, identifying 200 the most penalizing parameter among the said acquired parameters, the main consumption duration DTprin then being calculated for this most penalizing parameter during the calculation 120.

This step of identifying 200 of the most penalizing parameter from among the acquired parameters may comprise sub-steps.

In particular, a comparison 204 of the acquired parameters can be made with the respective thresholds attached to these parameters. Specific and distinct thresholds are thus associated respectively with the parameters of the source 10.

The thresholds may be predetermined and stored in a memory of the aircraft 1, or alternatively determined when the process according to the disclosure is carried out. In this case, the identification 200 may also include a definition 202 of thresholds relating respectively to the different parameters acquired during the acquisition 110.

A single threshold may be associated with a parameter. Alternatively, a 'normal' threshold characterising a functional limit of the source 10 with respect to this parameter and a 'critical' threshold characterising a degradation limit of the source 10 may be attached to each parameter.

Following this comparison 204, an estimate 206 of the most penalizing parameter is made using the calculator 9. The most penalizing parameter is then the parameter that most exceeds the corresponding threshold, i.e. for example the parameter that is greater than the corresponding threshold and with the greatest deviation from this threshold in value or percentage. If no threshold is exceeded by the corresponding parameter, then the most penalizing parameter is the parameter with the smallest deviation in value or percentage from the corresponding threshold.

The main consumption time DTprin is then advantageously determined, during calculation 120, for the most penalizing parameter identified. The main display 210 then indicates to an operator this minimised main consumption duration DTprin, the lowest duration of availability of the reference electrical power PRef taking into account the most critical parameter.

In addition, the method can include an alert informing an operator of the presence of a penalizing parameter, for example exceeding a threshold.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A method for monitoring an energy level of an electrical energy source, the electrical energy source being capable of delivering a reference electrical power for a predetermined reference time period for a predetermined reference charge level and comprising:

at least one electrical energy storage device;

at least one sensor; and a calculator, wherein the electrical energy source equips an aircraft comprising a hybrid power plant and a lift rotor rotated by the hybrid power plant via a mechanical transmission system, the hybrid power plant comprising at least one heat engine, at least one electric machine, and the electrical energy source electrically connected to the electric machine(s) via an electrical connection system;

wherein the method comprises the following steps:

acquiring at least one parameter of the electrical energy source via the sensor(s);

calculating, by the calculator, a main consumption time period wherein the electrical energy source is able to supply an electric current carrying the reference electrical power, as a function of the parameter(s) of the electrical energy source;

causing, by the calculator, a display unit to display a main display of main symbols indicating the main consumption time period;

determining, by the calculator, at least one characteristic of the aircraft based on information received from at least one sensor or avionics system of the aircraft;

estimating, by the calculator, at least one rate of sink and at least one distance that is reachable using only electrical energy that the electrical energy source can deliver as a function of the parameter(s) of the electrical energy source and the characteristic(s) of the aircraft; and causing, by the calculator, the display unit to display a descent display of descent symbols representing at least one trajectory of descent of the aircraft as a function of the rate of sink and the reachable distance.

2. The method according to claim 1, wherein the parameter(s) is/are chosen from a charge level, a temperature, and a level of ageing of the electrical energy source, and an electrical intensity and an electrical voltage of an electric current flowing in the electrical energy source, an internal resistance of the electrical energy source, an impedance of the electrical energy source, and a residual amount of the electrical energy source.

3. The method according to claim 2, wherein, when the electrical energy source comprises at least two electrical energy storage devices, the parameter(s) comprise(s) one or more parameters relating to each of the storage devices.

4. The method according to claim 1, wherein the method comprises estimating at least one additional consumption time period wherein the electrical energy source is able to supply an electric current carrying an additional electrical power different to the reference electrical power, as a function of the parameter(s) of the electrical energy source and the additional electrical power, and displaying an additional display of additional symbols indicating the additional consumption time period.

5. The method according to claim 1, wherein, during acquiring, a plurality of parameters of the electrical energy source are acquired, and the method comprises identifying a most penalizing parameter from among the acquired parameters, the main consumption time period being calculated for the most penalizing parameter during calculating.

6. The method according to claim 5, wherein identifying a most penalizing parameter among the acquired parameters comprises the following sub-steps:

comparing the acquired parameters with respective thresholds, and estimating the most penalizing parameter as being the parameter exceeding with the greatest deviation in value or percentage the threshold corresponding thereto or the parameter having the smallest deviation in value or percentage from the threshold if none of the thresholds is exceeded.

7. The method according to claim 1, wherein, when performing the estimation, several rates of sink and several reachable distances are estimated, being associated respectively with several different electrical powers that the electrical energy source can deliver, and several trajectories of descent are displayed.

8. The method according to claim 7, wherein the method comprises determining a maximum reachable distance equal to the greatest of the reachable distances, the maximum reachable distance being associated with an optimal rate of sink and an optimal electrical power.

9. The method according to claim 8, wherein the method comprises localizing a current position of the aircraft and the descent symbols comprise at least one reachable distance, displayed superposed on a map of the surroundings of the aircraft, that can be reached from the current position of the aircraft, the displayed reachable distance(s) being chosen from the estimated reachable distance(s) and wherein the displayed reachable distance(s) comprises the maximum reachable distance and a reference reachable distance associated with the reference electrical power.

10. The method according to claim 7, wherein the method comprises localizing a current position of the aircraft and the descent symbols comprise at least one reachable distance, displayed superposed on a map of the surroundings of the aircraft, that can be reached from the current position of the aircraft, the displayed reachable distance(s) being chosen from the estimated reachable distance(s).

11. The method according to claim 7, wherein the method comprises selecting a trajectory chosen from the trajectories of descent and displaying an assistance display of descent symbols comprising an artificial horizon and a descent reference mark representative of the rate of sink corresponding to the chosen trajectory.

12. The method according to claim 7, wherein the method comprises selecting a trajectory chosen from the trajectories of descent and displaying an assistance display of descent symbols comprising a power indicator of the aircraft and a power reference mark representative of the electrical power corresponding to the chosen trajectory.

13. The method according to claim 1, wherein the trajectory or trajectories of descent comprise(s) a first slope according to the estimated rate of sink corresponding to a flight with electrical power supplied by the electrical energy source and a second slope at an autorotation rate of sink to the ground corresponding to a flight without driving power.

14. The method according to claim 1, wherein the method comprises a step of constructing the trajectory of descent and/or a step of determining a speed of descent of the aircraft associated with the estimated rate of sink and with the corresponding electrical power, and/or a step of calculating a consumption time period associated with the electrical power corresponding to the rate of sink.

15. The method according to claim 1, wherein the characteristic of the aircraft is chosen from a height in relation to the ground, a forward speed and a vertical speed of the aircraft.

16. The method according to claim 1, wherein the rate of sink and the reachable distance are corrected as a function of a wind speed experienced by the aircraft.

17. The method according to claim 1, wherein the rate of sink is determined by the calculator using aircraft-performance data stored in a memory of the calculator or in a memory connected to the calculator, the aircraft-performance data associating aircraft characteristics and electrical powers supplied by the electrical energy source to the at least one electric machine with corresponding rates of sink.

18. The method according to claim 1, wherein the trajectory of descent is constructed by the calculator to determine the reachable distance, the reachable distance being a horizontal distance between a current position of the aircraft and a destination point of the trajectory of descent on the ground.

19. An electrical energy source for equipping an aircraft, the aircraft comprising a hybrid power plant and a lift rotor rotated by the hybrid power plant via a mechanical transmission system, the hybrid power plant comprising at least one heat engine and at least one electric machine, the electrical energy source being configured to be electrically connected to the at least one electric machine via an electrical connection system, the electrical energy source being capable of delivering a reference electrical power for a predetermined reference time period for a predetermined reference charge level, the electrical energy source comprising:

at least one electrical energy storage device;

at least one sensor; and calculator comprising at least one processor and at least one memory storing instructions that, when executed by the at least one processor, cause the calculator, when the electrical energy source equips the aircraft, to:

acquire at least one parameter of the electrical energy source via the at least one sensor;

calculate a main consumption time period wherein the electrical energy source is able to supply an electric current carrying the reference electrical power, as a function of the at least one parameter of the electrical energy source;

cause a display unit of the aircraft to display a main display of main symbols indicating the main consumption time period;

determine, based on information received from at least one sensor or avionics system of the aircraft, at least one characteristic of the aircraft;

estimate at least one rate of sink and at least one distance that is reachable using only electrical energy that the electrical energy source can deliver as a function of the at least one parameter of the electrical energy source and the at least one characteristic of the aircraft; and cause the display unit to display a descent display of descent symbols representing at least one trajectory of descent of the aircraft as a function of the rate of sink and the reachable distance.

20. An aircraft comprising:

a hybrid power plant comprising at least one heat engine and at least one electric machine;

a lift rotor rotated by the hybrid power plant via a mechanical transmission system;

a display unit;

an electrical energy source electrically connected to the at least one electric machine via an electrical connection system and capable of delivering a reference electrical power for a predetermined reference time period for a predetermined reference charge level, the electrical energy source comprising:

at least one electrical energy storage device;

at least one sensor; and calculator comprising at least one processor and at least one memory storing instructions that, when executed by the at least one processor, cause the calculator to:

acquire at least one parameter of the electrical energy source via the sensor;

calculate a main consumption time period wherein the electrical energy source is able to supply an electric current carrying the reference electrical power, as a function of the parameter of the electrical energy source;

cause the display unit to display a main display of main symbols indicating the main consumption time period;

determine, based on information received from at the least one sensor or avionics system of the aircraft, at least one characteristic of the aircraft;

estimate at least one rate of sink and at least one distance that is reachable using only electrical energy that the electrical energy source can deliver as a function of the parameter of the electrical energy source and the characteristic of the aircraft; and cause the display unit to display a descent display of descent symbols representing at least one trajectory of descent of the aircraft as a function of the rate of sink and the reachable distance.

* * * * *